United States Patent Office 3,827,936
Patented Aug. 6, 1974

3,827,936
PROCESS FOR PREPARING CYCLIC ANDENOSINE MONOPHOSPHATE
Yoshiaki Shimizu, Toshio Tatano, Yoshiyuki Akiyama, and Akira Yamaguchi, Shizuoka, Japan, assignors to Kyowa Hakko Kogyo Kabushiki Kaisha, Tokyo-to, Japan
No Drawing. Filed Oct. 1, 1971, Ser. No. 194,688
Claims priority, application Japan, Nov. 2, 1970, 45/95,876
Int. Cl. C12d 13/06
U.S. Cl. 195—28 N                 14 Claims

ABSTRACT OF THE DISCLOSURE

The present invention relates to a process for preparing cyclic adenosine monophosphate (hereinafter designated as "cyc-AMP") in good yield. More particularly, the present invention relates to a process for preparing cyc-AMP (i.e. adenosine-2′, 3′-phosphate) by way of enzymatic synthesis in which the adenosine phosphate, such as adenosine monophosphate (hereinafter designated as "AMP"), adenosine diphosphate (hereinafter designated as "ADP"), adenosine triphosphate (hereinafter designated as "ATP") etc. is reacted with an enzyme substrate obtained by fermentation of a microorganism having an adenylcyclase-activity, and characterized in that the reaction is carried out in the presence of at least one chelating agent.

BACKGROUND OF INVENTION

Known methods of preparing cyc-AMP by using microorganism include, for example, the cultivation of a bacterium such as *Escherichia coli* etc. in a medium containing a small amount of glucose. Another method involves the purification of adenylcyclase and the preparation of cyc-AMP from ATP in a cell-free reaction system. However, such processes have hardly been applicable to commercial production. The former process has the disadvantage of extremely poor yield of the accumulated cyc-AMP, and the latter process also have the disadvantage of difficulty in purifying adenylcyclase, as well as poor conversion ratio into cyc-AMP.

Accordingly, it is desired to have a process which can be carried out without purifying adenylcyclase, and at good conversion ratio of the substrate into cyc-AMP. It has now been discovered that the conversion ratio can significantly be improved by addition of chelating agent, and a large amount of cyc-AMP accumulated by carrying out the reaction of microbial bodies as an enzyme source with adenosine phosphate, such as ATP, ADP, AMP etc. in the presence of at least one chelating agent.

The present invention is clearly described in the following specification.

Any and all microorganisms having an adenylcyclase-activity may be used for the purpose of the present invention. Basically, such microorganisms fall within the following broad classes: *Brevibacterium* and *Escherichia*. Preferable microorganisms are exemplified by *Escherichia coli* (ATCC 8739), *Escherichia coli* K–12 (ATCC 10798), *Brevibacterium liquefaciens* (ATCC 14929), *Brevibacterium amoniagenes* (ATCC 6872), etc.

All of the above microorganisms are on deposit and freely available to the public at the American Type Culture Collection, located at 12301 Parklawn Drive, Rockville, Md.

Any and all natural and synthetic media containing suitable amounts of a carbon source, nitrogen source, inorganic substances and various other nutrients required for growth of the microorganisms used may be used for the purpose of the present invention so that there is no need to restrict further the components of the used medium.

Any assimilable carbon sources may be used for the cultivation of microorganism. Examples of preferable carbon sources include various carbohydrates such as glucose, fructose, secrose, maltose, mannose, glycerol, starch, starch hydrolsate, molasses, etc.; polyalcohols; various organic acids such as pyruvic acid, fumaric acid, lactic acid, acetic acid, etc.; hydrocarbons; alcohols.

Ammonia, various inorganic and organic ammonium salts such as ammonium chloride, ammonium sulfate, ammonium carbonate, ammonium acetate, etc., nitrogen-containing materials such as urea, etc., nitrogeneous organic materials such as peptone, meat extract, yeast extract, corn steep liquor, etc., may be used as nitrogen sources.

Further, various metal ions, for example, phosphates such as potassium monohydrogen phosphate, potassium dihydrogen phosphate; sulfates such as magnesium sulfate, manganese sulfate, ferous sulfate, etc. may be used as inorganic substances.

Culturing is carried out under aerobic conditions such as by shaking culturing, submerged culturing with agitation and aeration, etc. at a temperature of preferably 20–40° C. The pH of the medium during the culturing is desirably kept at about neutral to obtain microbial cells having a high adenylcyclase activity. However, these temperature and pH conditions are not essential. Culturing time is preferably about 8–90 hours.

Adenylcyclase is produced in the cells thus cultured. The pH of the cultured liquor is adjusted to 3–7 to collect cells which are then suspended in water. To this suspension is added at least one member of the group of ATP, ADP and AMP as the substrate and at least one chelating agent. Various conventional chelating agents, such as ethylenediaminetetraacetic acid (hereinafter referred to as EDTA), cyclohexanediaminetetraacetic acid (hereinafter referred to as Cy DTA), nitrilotriacetic acid (hereinafter referred to as NTA), hydroxyethylethylenediaminetriacetic acid (hereinafter referred to as EDTA-OH) may be used. Generically, chelating agents which are capable of forming a chelate with magnesium ion ($Mg^{++}$) may be used, and which is added to a reaction solution to give a final concentration of 2 to 30mM. for the practice of the present invention.

The reaction is carried out at a pH of 4.0–8.0 (preferably 6.0–7.5), and at a temperature of 35–45° C. (preferably 38–43° C.) for 1–24 hours. Generally, about 1 to 10 mg./ml. preferably 3 to 7 mg./ml. of adenosine phosphate, based on suspension of microbial cells are employed.

After completion of the reaction, cyc-AMP is isolated from the reaction solution by using a weakly acidic ion exchange resin and a strongly basic ion exchange resin in combination. Alternative means for isolating cyc-AMP may be employed.

The following non-limitative examples illustrate the invention.

Example 1

*Escherichia coli* K–12 (ATCC 10798) is cultured with agitation (300 r.p.m.) in a medium containing glucose (3%), yeast extract (0.6%), monopotassium phosphate (0.85%), dipotassium phosphate (1.1%) and magnesium sulfate (0.1%) at 37° C., at pH 6.8 for 8 hours.

The pH of the cultured liquor is adjusted to 4 by addition of a mineral acid such as hydrochloric acid, sulfuric acid, etc. In this example, hydrochloric acid was added and the liquor centrifuged to separate microbial cells which were then suspended in deionized water at a concentration of about 20 mg./ml. as dried cell weight.

To this suspension ATP is added to give a concentration of 5 mg./ml. The suspension was divided into several fractions to which various chelating agents listed in the following table were respectively added so as to give a final concentration of 10 mM. of chelating agent. All fractions were subject to the reaction carried at a pH of 7.0 and at a temperature of 40° C. for 3 hours to give the amounts of cyc-AMP shown in Table 1.

TABLE 1

| Chelating agent: | Amount of cyc-AMP produced (mg. per mol of suspension), mg./ml. |
|---|---|
| None | 0.13 |
| EDTA | 2.35 |
| Cy DTA | 1.85 |
| EDTA-OH | 1.75 |
| NTA | 0.70 |

Example 2

Escherichia coli K-12 (ATCC 10798) was cultured in a similar manner to that described in Example 1 and the cells obtained were suspended in deionized water to give a concentration of about 20 mg./ml. as dried cell weight. This suspension was divided into several fractions.

To these fractions various substrates listed in the following table were respectively added to give a concentration of 5 mg./ml. (based on suspension) and to each fraction EDTA was then added to give a final concentration of 10 mM. All fractions were subjected to the reaction carried out at a pH of 7.0 and at a temperature of 40° C. for 3 hours.

As a control, a similar reaction to that described above was carried out except that EDTA was not added. The results obtained are shown in Table 2.

TABLE 2

| | Amount of cyc-AMP produced (mg./ml.) | |
|---|---|---|
| Substrate | With addition of EDTA | Without addition of EDTA |
| ATP | 2.40 | 0.11 |
| ADP | 1.29 | 0.10 |
| AMP | 1.20 | 0.12 |

Example 3

Escherichia coli K-12 (ATCC 10798) was cultured in a similar manner to that described in Example 1 and the thus obtained cells were suspended in deionized water to give a concentration of about 20 mg./ml. as dried cell weight.

To this suspension ATP was added to give a concentration of 5 mg./ml. and Cy DTA was then added to give a concentration of 5 mM. The reaction was carried out at a pH of 6.5 and at a temperature of 40° C. for 6 hours to yield 2.4 mg./ml. of cyc-AMP in the reaction liquor.

As a control, a similar treatment to that described above was carried out except that Cy DTA was not added. Only 0.09 mg./ml. of cyc-AMP was thereby obtained.

Example 4

Escherichia coli K-12 (ATCC 10798) was cultured in a similar manner to that described in Example 1 and the cells thus obtained were suspended in deionized water to give a concentration of about 20 mg./ml. (calculated as dried cell weight).

To this suspension AMP was added to give a concentration of 5 mg./ml., NTA was then added to give a concentration of 2 mM. The reaction was carried out at a pH of 6.5 and at a temperature of 40° C. for 6 hours to give 0.80 mg./ml. of cyc-AMP in the reaction solution.

As a control, a similar treatment to that described above is carried out except NTA was omitted to give 0.02 mg./ml. of cyc-AMP as product.

Example 5

Brevibacterium liquefaciens (ATCC 14929) was cultured with agitation (300 r.p.m.) in a medium containing DL-alanine (2%), L-glutamic acid (1%), magnesium sulfate (0.10%), monopotassium phosphate (0.85%) and dipotassium phosphate (1.1%) at a pH of 6.8 and at a temperature of 27° C. for 88 hours. The cultured liquor was adjusted to a pH of 4 which a mineral acid such as sulfuric acid, hydrochloric acid, etc. and centrifuged to separate microbial cells. The cells were suspended in deionized water to give a concentration of about 20 mg./ml. (calculated as dried cell weight).

To this suspension ATP was added to give a concentration of 5 mg./ml. EDTA was then added to give a concentration of 5 mM. The reaction was carried out at a pH of 6.5 and at a temperature of 40° C. for 6 hours to yield 0.18 mg./ml. of cyc-AMP in the reaction solution.

As a control, a similar reaction to that described above is carried out except that EDTA was omitted to give 0.01 mg./ml. of cyc-AMP.

What is claimed is:

1. A process for preparing cyclic adenosine monophosphate which comprises culturing a microorganism having an adenylcyclase-activity and belonging to the genus selected from the group consisting of Brevibacterium and Escherichia in a nutrient medium so as to give adenylcyclase containing cells, and subjecting the adenylcyclase containing cells to reaction with an adenosine phosphate in the presence of a chelating agent capable of forming a chelate with magnesium ion ($Mg^{++}$).

2. The process of Claim 1, in which the microorganism is Brevibacterium liquefaciens ATCC 14929.

3. The process of Claim 1, in which the microorganism is Brevibacterium ammoniagenes ATCC 6872.

4. The process of Claim 1, in which the microorganism is Escherichia coli ATCC 10798 or ATCC 8739.

5. The process of Claim 1, in which the culturing is carried out aerobically at a temperature of 20–40° C. and at a neutral pH.

6. The process of Claim 1, in which the culturing is carried out for 8–90 hours.

7. The process of Claim 1, in which the reaction is carried out at a pH of 4.0–8.0 and a temperature of 35–45° C.

8. The process of Claim 1, in which the reaction is carried out for 1–24 hours.

9. The process of Claim 1, in which the adenosine phosphate is selected from the group consisting of adenosine monophosphate, adenosine diphosphate and adenosine triphosphate.

10. The process of Claim 1, in which the chelating agent is selected from the group consisting of ethylenediaminetetraacetic acid, cyclohexanediaminetetraacetic acid, nitrilotriacetic acid and hydroxyethylenediaminetriacetic acid.

11. The process of Claim 1, in which the adenylcyclase is present in the form of a cell suspension.

12. A process for preparing cyclic adenosine monophosphate which comprises culturing a microorganism having an adenylcyclase-activity and belonging to the genus Brevibacterium or Escherichia in a nutrient medium so as to give adenylcyclase containing cells, and subjecting the adenylcyclase containing cells to a reaction with an adenosine phosphate in the presence of 2 to 30 mM. of a chelating agent capable of forming a chelate with magnesium ($Mg^{++}$) ion.

13. The process of Claim 12, wherein the chelating agent is selected from the group consisting of ethylenediaminetetraacetic acid, cyclohexanediaminetetraacetic acid, nitriloacetic acid and hydroxyethylethylenediaminetriacetic acid.

14. A process for preparing cyclic adenosine monophosphate which comprises culturing a microorganism selected from the group consisting of Brevibacterium liquefaciens ATCC 14929, Brevibacterium ammoniagenes ATCC 6872, Escherichia coli ATCC 10798 and Escheri-

*chia coli* ATCC 8739 in a nutrient medium comprising carbon source and nitrogen source at a temperature of 20–40° C. and a pH of neutrality for 8–90 hours under aerobic condition to give a fermentation liquor, separating cell bodies from the liquor and suspending said cell bodies in water so as to form a suspension, said cell bodies containing adenylcyclase, and subjecting the same to a reaction carried out at a temperature of 35–45° C. and at a pH of 4.0–8.0 for 1–24 hours with an adenosine phosphate selected from the group consisting of adenosine monophosphate, adenosine diphosphate and adenosine triphosphate in the presence of at least one chelating agent selected from the group consisting of ethylenediaminetetraacetic acid, cyclohexanediaminetetraacetic acid, nitriloacetic acid and hydroxyethylethylenediaminetriacetic acid.

References Cited
UNITED STATES PATENTS 3,630,842   12/1971   Ishiyama et al. _____ 195—28 N ALVIN E. TANENHOLTZ, Primary Examiner